United States Patent [19]

Arpin

[11] Patent Number: 4,994,536

[45] Date of Patent: Feb. 19, 1991

[54] THERMALLY STABLE BISIMIDO COPOLYMERIZATES

[75] Inventor: Rene Arpin, Lyon, France

[73] Assignee: Rhone-Poulenc Chimie, Courbevoie, France

[21] Appl. No.: 210,508

[22] Filed: Jun. 23, 1988

[30] Foreign Application Priority Data

Jun. 23, 1987 [FR] France ............................... 87 09000
Dec. 2, 1987 [FR] France ............................... 87 17014

[51] Int. Cl.$^5$ .............................................. C08F 22/40
[52] U.S. Cl. .................................... 526/262; 525/502; 526/204; 523/439; 524/104; 528/94; 528/98; 528/117
[58] Field of Search ............... 526/262, 204; 528/94, 528/98, 117; 525/502; 524/104; 523/439

[56] References Cited

U.S. PATENT DOCUMENTS

| | | | |
|---|---|---|---|
| 3,649,604 | 3/1972 | Imoto | 526/204 |
| 3,912,606 | 10/1975 | Pacific | 526/204 |
| 3,970,535 | 7/1976 | McGinniss | 526/204 |
| 3,978,152 | 8/1976 | Gruffaz | 525/502 |
| 4,100,140 | 7/1978 | Zahir et al. | 526/204 |
| 4,354,965 | 10/1982 | Lee et al. | 524/104 |
| 4,413,107 | 11/1983 | Locatelli | 526/262 |
| 4,518,754 | 3/1985 | Locatelli | 526/262 |
| 4,632,966 | 12/1986 | Kanagawa | 525/502 |
| 4,742,141 | 5/1988 | Dien | 526/262 |

FOREIGN PATENT DOCUMENTS

| | | | |
|---|---|---|---|
| 0167304 | 8/1986 | European Pat. Off. | |
| 2544900 | 7/1976 | Fed. Rep. of Germany | 526/204 |
| 51-37669 | 10/1976 | Japan | 526/204 |
| 55-127550 | 2/1980 | Japan | 526/204 |

*Primary Examiner*—C. Warren Ivy
*Assistant Examiner*—Alex H. Walker
*Attorney, Agent, or Firm*—Burns, Doane, Swecker & Mathis

[57] ABSTRACT

Thermally stable bisimido polymers, devoid of diamine component and well adapted for the production of laminates, are prepared by copolymerizing (a) an N,N'-bis-maleimide with (b) an acrylate comonomer, e.g., a novolak epoxy (meth)acrylate, in the presence of a catalytically effective amount of (c) an imidazole compound, and, optionally, (d) a chlorinated or brominated epoxy resin, or admixture thereof with a non-chlorinated or non-brominated epoxy resin.

13 Claims, No Drawings

THERMALLY STABLE BISIMIDO COPOLYMERIZATES

BACKGROUND OF THE INVENTION

1. Field of the Invention

The present invention relates to novel thermally stable bisimido polymers, and to processes for the preparation of such polymers.

2. Description of the Prior Art

Polymers produced by reacting an N,N'-bisimide of an unsaturated dicarboxylic acid such as, for example, a N,N'-bismaleimide, with a diprimary diamine are known to this art. Compare published French Application No. 1,555,564. The amounts of N,N'-bisimide and of diamine are selected such that the ratio:

$$\frac{\text{number of moles of bisimide}}{\text{number of moles of diamine}}$$

is at least equal to 1; furthermore, it is generally preferred that it be less than 50. Thermally stable resins are thus obtained, which withstand very well severe thermal stresses.

In the aforementioned published French application, it is indicated generally that the preparation of these resins may be carried out in bulk, by heating the reactants which have been intimately mixed beforehand, or else in an inert polar diluent such as dimethylformamide, N-methylpyrrolidone or dimethylacetamide, it being possible for this latter process to be employed, for example, when the application of the polymer requires a solution thereof to be used.

Finally, it is also noted that, for many uses, it is advantageous to conduct the reaction in two stages; in a first stage, a prepolymer is prepared by heating an intimate mixture of the two reactants to a temperature on the order of 100° to 250° C. The prepolymer obtained may be used in the form of a solution, suspension or powder, or else it can also be shaped merely by being cast hot. In a second stage, curing of the prepolymer is effected by heating same to temperatures on the order of 300° C., optionally under pressure.

These polymers may be converted into films or into polycellular materials. They are of very particular interest for the manufacture either of articles which are molded optionally in combination with fibers or pulverulent fillers, or of laminates based on inorganic fibers (single fibers, fabric or nonwoven fibers) such as, for example, carbon, boron or glass fibers. However, the preparation and the use of these polymers require precautions to be taken so far as health and hygiene are concerned, when the diprimary diamine employed is of aromatic nature, because of the toxicity of certain of these compounds.

Thus, to overcome this disadvantage, need exists for novel polymers containing imide groups which do not require diamines for the preparation thereof.

Polymers containing imide groups which may be prepared without the use of diamines have already been described in European patent application Ser. No. EP-A-0,167,304. Such polyamides are produced, for example, from:

(i) a combination of a number of N,N'-bismaleimides: and (ii) a (meth)acrylic ester consisting of the reaction product of (meth)acrylic acid with an epoxy resin, such as a glycidyl ether of poly(hydroxyphenyl)alkane or of a phenol/formaldehyde polycondensate of the novolak type.

It has now been determined that the disclosure of the above-mentioned patent application does not make it possible, beginning with a reactant generating imide groups consisting of a single N,N'-bismaleimide by itself, to produce homogeneous prepolymers, and polymers in the case of which the bismaleimide and the (meth)acrylic ester are subjected to a joint copolymerization reaction. It has also been ascertained that the prepolymers which can be prepared are ill-suited for the production of preimpregnated intermediate articles (used for the manufacture of laminates) when the solvent-impregnation technique is employed, because of the very low solubility of these prepolymers in the solvents which are generally employed.

SUMMARY OF THE INVENTION

Accordingly, a major object of the present invention is the provision of novel polymers containing imide groups produced from a single N,N'-bismaleimide alone and from an epoxy resin (meth)acrylic ester. These novel copolymers are homogeneous and are perfectly suitable, when they are in the form of prepolymers, for applications requiring the use of a solution of the polymer in a solvent. To prepare the copolymers of the present invention, an additional reactant, namely, an imidazole compound, is added to the reaction medium for preparing the desired polyamides.

Briefly, the present invention features novel polymers containing imide groups, comprising the copolymerizate, at a temperature ranging from 50° C. to 300° C., of:

(a) an N,N'-bismaleimide of the formula:

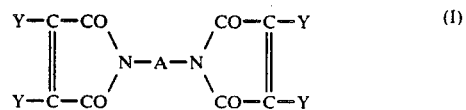 (I)

in which:

each of the symbols Y, which may be identical or different, is a hydrogen atom, a methyl radical or a chlorine atom;

the symbol A is a divalent radical selected from among cyclohexylene, phenylene, 4-methyl-1,3-phenylene, 2-methyl-1,3-phenylene, 5-methyl-1,3-phenylene, 5-methyl-1,3phenylene and 2,5-diethyl-3-methyl-1,4-phenylene radicals, or one of the radicals of the formula:

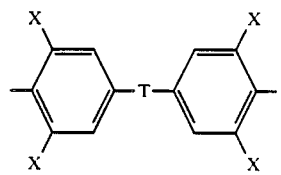

in which T is a single valence bond or one of the groups:

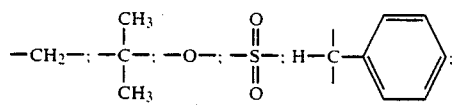

-continued

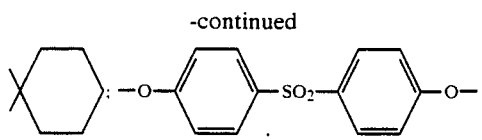

and each of the symbols X, which may be identical or different, is a hydrogen atom or a methyl, ethyl, propyl or isopropyl radical; with (b) an acrylate reactant which comprises either:

(b1) a novolak epoxy (meth)acrylate corresponding to the general formula:

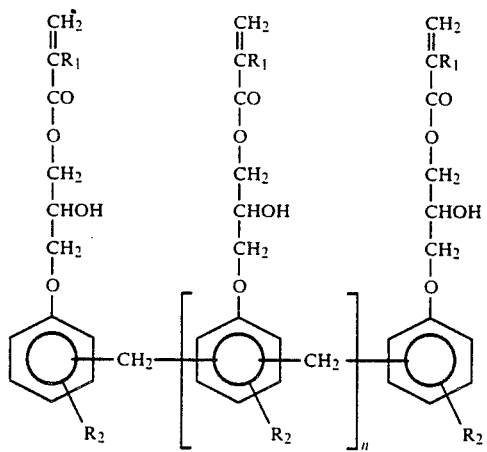

in which:

each of the symbols R1 and R2, which may be identical or different, is a hydrogen atom or a methyl radical; and n is a positive number ranging from 0.1 to 8;

or a mixture of the aforesaid compound (b1) with not more than 30% by weight, relative to the weight of the mixture (b1)+(b2), of a compound (b2) of the general formula:

$$-(CH_2=CR_3-CO-O)_3-Z-.$$

in which:

the symbol $R_3$ is a hydrogen atom or a methyl radical;

the symbol Z is a trivalent organic radical derived from a linear or branched chain saturated aliphatic hydrocarbon containing from 1 to 20 carbon atoms, with the proviso that such radical may contain one or more oxygen bridges and one or more hydroxyl groups; and with (c) an imidazole compound.

DETAILED DESCRIPTION OF THE PREFERRED EMBODIMENTS OF THE INVENTION

More particularly according to the present invention, exemplary of the bisimides (a) of the formula (I), particularly representative are:
N,N'-meta-phenylenebismaleimide;
N,N'-para-phenylenebismaleimide;
N,N'-4,4'-diphenylmethanebismaleimide;
N,N'-4,4'-diphenyl ether bismaleimide;
N,N'-4,4'-diphenylsulfonebismaleimide;
N,N'-1,4-cyclohexylenebismaleimide;
N,N'-4,4'-diphenyl-1,1-cyclohexanebismaleimide;
N,N'-4,4'-(2,2-diphenylpropane)bismaleimide;
N,N'-4,4'-triphenylmethanebismaleimide;
N,N'-2-methyl-1,3-phenylenebismaleimide;
N,N'-4-methyl-1,3-phenylenebismaleimide; and
N,N'-5-methyl-1,3-phenylenebismaleimide.

These bismaleimides may be prepared according to the processes described in U.S. Pat. No. 3,018,290 and British Pat. No. 1,137,290. N,N'-4,4'-diphenylmethanebismaleimide is preferred according to the present invention.

The novolak epoxy (meth)acrylates (b1) of formula (II) are known materials, certain of which are available commercially. They may be prepared by reacting (meth)acrylic acid with an epoxy resin of the novolak type, the latter being the product of reaction between epichlorohydrin and phenol-formaldehyde polycondensates ($R_2$ in the formula (II) given above is then a hydrogen atom) or with cresol/formaldehyde polycondensates ($R_2$ in formula (II) is then a methyl radical). These oligomeric polyacrylates (b1) of formula (II) and a process for preparing them is described, for example, in U.S. Pat. No. 3,535,403.

As specific examples of compounds (b2) of formula (III) which may be used together with the novolak epoxy (meth)acrylate (b1), particularly representative are the polyol (meth)acrylic esters such as 1,2,4-butanetriol tri(meth)acrylate, 1,2,6-hexanetriol tri(meth)acrylate, trimethylolpropane tri(meth acrylate and pentaerythritol tri(meth)acrylate.

According to the present invention, the novolak epoxy acrylates (b1) of formula (II) are preferred, in which $R_1$ and $R_2$ are each a hydrogen atom and n is a positive number ranging from 0.1 to 5, these compounds being used either alone or mixed with not more than 25% by weight, relative to the weight of the mixture (b1)+(b2), of a compound (b2) being trimethylolpropane triacrylate.

The amounts of N,N'-bisimide (a) and of acrylate reactant (b) are selected such that the radio r:

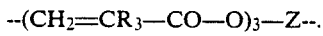

ranges from 1.7/1 to 10/1, and, preferably from 2/1 to 8/1. It will be appreciated that the expression "acrylic double bonds contributed by the reactant (b)" connotes all $CH_2=CR_1$ groups contributed by the compound (b1) plus, where appropriate, all $CH_2=CR_3$ groups contributed by the compound (b2).

The imidazole compound (c) corresponds to the general formula:

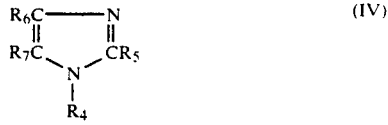

in which each of $R_4$, $R_5$, $R_6$ and $R_7$, which may be identical or different, is a hydrogen atom, an alkyl or alkoxy radical containing from 1 to 20 carbon atoms, or a vinyl, phenyl or nitro radical, with the proviso that $R_6$ and $R_7$ may together form, with the carbon atoms from which they depend, a single ring member, such as, for example, a benzene ring.

As specific examples of such imidazole compounds, particularly representative are imidazole or glyoxaline, 1-methylimidazole, 2-methylimidazole, 1,2-dimethylimidazole, 1-vinylimidazole, 1-vinyl-2-methylimidazole and benzimidazole.

The imidazole compound is incorporated in catalytic amounts. Depending on the nature of the imidazole compound and depending on the desired polymerization rate at the application stage, the imidazole compound is employed in a proportion, expressed as the number of moles of compound (c) per 100 g of bisimide (a), ranging from $0.15 \times 10^{-3}$ to $6 \times 10^{-3}$ and, preferably, from $0.3 \times 10^{-3}$ to $4 \times 10^{-3}$.

It has also been found, and this constitutes another object of the present invention, that it is possible to impart special properties to the above polymers by the supplementary addition to the medium in which they are prepared of a chlorinated or brominated epoxy resin, the latter being employed either alone or mixed with a non-chlorinated or non-brominated epoxy resin. This option makes it possible to impart excellent combustion resistance to the polymers which are prepared in this manner.

More precisely, the present invention also features polymers containing imide groups and prepared from, in addition to the reactants (a), (b) and (c), an epoxy resin (d) comprising either a chlorinated or brominated epoxy resin (d1), or a mixture of the resin (d1) with a non-chlorinated or non-brominated epoxy resin (d2).

By a "chlorinated or brominated epoxy resin" (d1) is intended an epoxy resin which has an epoxy equivalent weight of from 100 to 500 and which comprises a glycidyl ether obtained by reacting epichlorohydrin with a derivative which is chlorinated or brominated on the aromatic ring(s) and which originates from a polyphenol selected from among the class of bis(hydroxyphenyl)alkanes such as 2,2-bis(4-hydroxyphenyl)propane, bis(4-hydroxyphenyl)methane, bis(4-hydroxyphenyl)-methylphenylmethane and bis(4-hydroxy-phenyl)-tolylmethanes, resorcinol, hydroquinone, pyrocatechol, 4,4'-dihydroxydiphenyl, and the products of condensation of the aforementioned phenols with an aldehyde.

By a "non-chlorinated or non-brominated epoxy resin" (d2) is intended an epoxy resin which has an epoxy equivalent weight which also ranges from 100 to 500 and which comprises a glycidyl ether obtained by reacting epichlorohydrin with a non-chlorinated or non-brominated polyphenol selected from among the aforementioned phenols.

The expression "epoxy equivalent weight", which appears above, is defined as being the weight of resin (in grams) containing one epoxy group

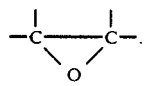

An epoxy resin which has an epoxy equivalent weight of from 150 to 300 is preferably selected, and this applies both to the resin (d1) and to the resin (d2) which may be employed mixed with the resin (d1). As to the physical characteristics of this resin, these range from those of liquid resins of low viscosity (approximately $2 \times 10^{-3}$ Pa.s at 25° C.) to those of pasty resins, the melting points of which are on the order of 60° C.

When an epoxy resin (d) is used, then it is most preferable to use an epoxy resin comprising either a resin (d1) belonging to the class of bis(hydroxyphenyl)alkane glycidyl ethers brominated on the aromatic rings, as discussed above in connection with the detailed definition of the resin (d1), or of the mixture of a resin of this kind (d1) with a resin (d2) belonging to the class of non-brominated bis(hydroxyphenyl)alkane glycidyl ethers.

The quantity of epoxy resin (d), when it is decided to employ an ingredient of this kind, represents 2% to 20%, and preferably 3% to 15% of the weight of the mixture of bisimide (a) +acrylate reactant (b).

Furthermore, when an epoxy resin (d) is used, it has been found that the quantity of chlorine or of bromine contributed by this epoxy resin to the polymers according to the invention is capable of affecting certain properties of the cured polymers obtained, particularly the properties related to thermal stability and those related to the adhesiveness of the polymers to metals such as, for example, copper. In this case, the best results are then obtained when this quantity of chlorine or bromine contributed by the epoxy resin (d), expressed as the weight percentage of elemental chlorine or of elemental bromine relative to the weight of the overall mixture of bisimide (a) +acrylate reactant (b) +epoxy resin (d), represents not more than 6%; this quantity of chlorine or bromine preferably ranges from 1 to 4%. The quantity of chlorine or bromine can be easily adjusted to the desired value by using epoxy resins (d1) (employed in quantities representing 2 to 20% and, preferably, 3 to 5% of the weight of the mixture of bisimide acrylate reactant) having a more or less considerable chlorine or bromine content and/or by starting with mixtures of chlorinated or brominated epoxy resins (d1) with non-chlorinated or non-brominated epoxy resins (d2).

The polymers according to the invention may be prepared in bulk, by directly heating the bisimide (a), the acrylate reactant (b) and the imidazole compound (c), in the optional presence of the epoxy resin (d), at least until a homogeneous liquid mixture is obtained. The temperature may vary as a function of the physical state of the compounds present, but it generally ranges from 50° C. to 300° C. It is advantageous for the starting compounds to be brought to and maintained in an intimately mixed state before and during the heating, for example by means of satisfactory stirring. The imidazole compound (c) is preferably added at the outset to the well-stirred mixture of the reactants (a) and (b) +optionally (d), such as to enable it to disperse rapidly. When this compound is particularly active, it is desirable to add it in a solvent which is compatible with the reaction medium. To avoid its encapsulation in the polymer lattice produced, it has been found that it could be advantageous to use, as a solvent, one of the polar organic liquids which are discussed below.

The polymers according to the invention may also be prepared by heating the mixture of reactants in an organic diluent which is liquid over at least at part of the range 50° C.–300° C. Among these diluents, particularly representative are aromatic hydrocarbons such as the xylenes and toluene, halogenated hydrocarbons such as chlorobenzenes, polar solvents such as dioxane, tetrahydrofuran, dibutyl ether, dimethylformamide, dimethyl sulfoxide, N-methylpyrrolidone, dimethylacetamide, methylglycol, methyl ethyl ketone and cyclohexanone. The polymer solutions or suspensions may be employed as such for many uses; the polymers may also be isolated, for example by filtration, if need be after precipitation by means of a suitable nonsolvent.

It will be appreciated that the properties of the polymers according to the invention may vary widely, depending, in particular, on the precise nature of the reactants employed, the proportions of reactants selected and the precise temperature conditions adapted within the above-mentioned range. Insofar as the polymers obtained are concerned, these may be cured polymers, which are insoluble in the usual polar solvents such as, for example, the liquids referred to in the preceding paragraph and which exhibit no appreciable softening below the temperature at which they begin to degrade.

However, these polymers may also be in the form of prepolymers (P) which are soluble in polar organic solvents such as, for example, those referred to above and which have a softening point at a temperature below 200° C. (this softening point generally ranges from 50° to 150° C.). These prepolymers may be produced in bulk by heating the mixture of reactants until a homogeneous or pasty product is obtained at a temperature which generally ranges from 50° to 80° C., for a period of time which may range from a few minutes to a few hours, this time being proportionately shorter the higher the temperature adopted. In this case too, it is advantageous to mix the reactants intimately by stirring before the mixture is subjected to heating. A preferred method of using the imidazole compound (c) exists in this case as well, and it is that indicated above in connection with the direct preparation of cured polymers. The prepolymers may also be prepared in suspension or in solution in a diluent which is liquid over at least a part of the range 50°–180° C.

The prepolymers (P) may be used in the form of a liquid mass, simple hot casting being sufficient for shaping and producing molded articles. They may also be used, after cooling and grinding, in the form of powders which are remarkably suited to compression molding operations, optionally in the presence of fillers in the form of powders, spheres, granules, fibers or flakes. In solution form, the prepolymers (P) may be used for producing preimpregnated intermediate articles in which the reinforcement may comprise fibrous materials (in the form of a single fiber or of woven or nonwoven sheets) based on aluminum or zirconium silicate or oxide, carbon, graphite, boron, asbestos or glass. These prepolymers (P) may also be used for the production of cellular materials after incorporation of a blowing agent such as, for example, azodicarbonamide.

In a second stage, the prepolymers (P) may be cured by heating same to temperatures on the order of 300° C., generally from 150° to 300° C. A final shaping may be performed during the curing, under vacuum or at a super-atmospheric pressure if desired, it being also possible for these operations to be consecutive.

According to a preferred embodiment of the present invention, the operation is carried out in two stages, the first stage including heating the mixture of reactants at from 50° C. to 180° C. to form a prepolymer (P), and the second stage including curing the prepolymer (P), after it has been shaped as desired, by heating same to temperatures on the order of 300° C., generally from 150° C. to 300° C.

However, according to a still more preferred embodiment of the present invention, the operation is carried out in two stages, but using, in the first stage, a continuous process for preparing the prepolymer (P) by separately introducing into a kneader fitted with an extruder screw:

(1) on the one hand, the bisimide (a) in a divided solid state; and (2) on the other hand, the group of reactants including the acrylate reactant (b) in the liquid or molten state, the imidazole compound (c) in the solid state or in solution and, optionally, the epoxy resin (d) in the liquid state, it being possible for the various reactants in this group themselves to be introduced together or separately, for their part.

By the expression "kneader fitted with an extruder screw" is intended a device which produces no dead zone when the material is advanced forward. Devices of this kind, which may incorporate one or more screws, are described in the work by E.G. Fisher, *Extrusion of Plastics* (Interscience Publishers 1964), pages 104 to 108. These kneaders may include two endless screws meshing intimately with each other and rotating in the same direction; a device of this type, equipped more particularly for the preparation of alkali metal terephthalates, is described in published French application Ser. No. 1,462,935. Another type of kneader which can be employed is a device incorporating an endless screw with interrupted flights simultaneously performing a rotary motion and an oscillating motion in the axial direction and housed in a casing comprising teeth which interact with the interrupted flights of the screw. Devices of this type are described in published French applications Ser. Nos. 1,184,392, 1,184,393, 1,307,106 and 1,369,283.

For reasons of convenience, it is preferred to employ the bisimide (a) in the form of particles, the dimensions of which range from 0.1 to 5 mm. Their introduction into the kneader may be regulated by means of known devices for such purpose, such as metering screws or balances.

The acrylate reactant (b) is fed into the kneading zone in the liquid state. Its introduction may be carried out using a metering pump. The reactant (b) is introduced at one or more points which are preferably situated downstream of the zone for introduction of the bisimide (a).

The imidazole compound (c) may be incorporated in the solid state with the acrylate reactant (b). However, it is preferred to incorporate the imidazole compound (c) in the form of a solution in a polar solvent such as those discussed above, together with the acrylate reactant. Its introduction into the kneader may also be performed at any other point of the kneading zone which is preferably situated downstream of the zone where the acrylate reactant (b) is introduced.

Insofar as the epoxy resin (d) is concerned, when indeed used, it is introduced into the kneading zone in the liquid state, at one or more points which are also preferably situated downstream of the zone where the bisimide (a) is introduced. In this case, the acrylate reactant (b), the imidazole compound (c) and the epoxy resin (d) are preferably introduced into the kneading zone together in the form of a mixture, at one or more points situated downstream of the zone where the bisimide (a) is introduced.

Maintaining the selected temperature, which ranges from 50° C. to 180° C. and, preferably, from 130° C. to 160° C., in the kneading zone is generally carried out by controlled heating of the jacket of the endless screw or screws of the device. Insofar as the jacket is concerned, the heating may be applied uniformly over its entire length, but it is also possible to arrange a number of adjacent heating zones providing the kneading zone with a temperature which, for example, increases in the direction of forward travel of the material. In the preferred embodiment, where one or more reactant(s) of the group (b) +(c) +optionally (d) are introduced downstream of the zone where the imide reactant (a) is introduced, it is preferable for the temperature to range from 20° to 130° C. upstream of the first point where the reactant(s) forming part of the above-mentioned group is (or are) introduced.

The residence time of the materials in the kneading zone may vary to some extent depending on the bisimide (a) employed, on the adopted temperature and on the quantities of reactants employed. As a general rule, it is on the order of 1to 30 minutes. The softening point of the prepolymer (P) can be regulated as it exits the kneader, by heating the polymer in an oven under determined temperature and time conditions.

The polymers according to the invention are of interest to those industrial sectors which require materials endowed with good mechanical and electrical properties and with high chemical inertness at temperatures of 200° to 300° C. By way of examples, they are particularly suitable for the manufacture of preimpregnated intermediate articles. The preimpregnated articles can be employed for producing components of various shapes and for various purposes in many industries such as, for example, aeronautics. These components, known as laminates, which may be components of revolution, are obtained by stacking a number of layers of prepregs on a former or a support. The prepregs may also be employed as reinforcements or as means of repairing damaged components.

In order to further illustrate the present invention and the advantages thereof, the following specific examples are given, it being understood that same are intended only as illustrative and in nowise limitative.

EXAMPLE 1

This example describes a polymer according to the invention, prepared by a discontinuous process, from reactants (a), (b) and (c).

Into a reactor, fitted with a stirrer and placed in an oil bath thermostatted at 160° C., were introduced:

(i) 320 parts by weight of N,N'-4,4'-diphenylmethanebismaleimide (0.558 maleimide groups per 100 g of bisimide), having a softening point of 157° C.; and (ii) 78 parts by weight of acrylate reactant which was a base mixture of approximately 80% by weight of a [novolak epoxy diacrylate of formula (II) in which $R_1=R_2=H$ and n is a number of from 2 to 4 and 20% by weight of trimethylolpropane triacrylate; this reactant is available commercially under the registered trademark Ebecryl 629 from UCB and it contains approximately 0.5 free acrylic double bonds per 100 g of reactant.

The mixture was stirred for 40 minutes until a homogeneous mass was obtained. 0.20 parts by weight of imidazole were then added in the form of a solution in N-methylpyrrolidone containing 10% by weight of imidazole.

Stirring of the reaction mixture was continued for 20 minutes at 160° C. and the mixture was then cast onto a plate. After cooling, the prepolymer obtained was ground and a yellow powder was obtained, which was soluble in solvents such as, for example, N-methylpyrrolidone, cyclohexanone and dimethylformamide. The prepolymer obtained had a softening point of 83° C.; its viscosity, measured in solution at a concentration of 50% by weight in cyclohexanone, was 0.35 Pa.s.

A solution containing 50% by weight of prepolymer in N-methylpyrrolidone was used to coat a glass fabric manufactured by Porcher under the reference 7628, whose weight per unit area was 200 g/m² and which had been subjected to a treatment with gamma-aminopropyltriethoxysilane (Union Carbide silane A 1100). The impregnated fabric contained 35 g of prepolymer per 65 g of fabric; it was dried for 5 minutes in a ventilated atmosphere at 130° C. 6 squares (15×15 cm) were then cut therefrom and were stacked with a sheet of copper 35 μm in thickness which was placed on one of the outer faces of the stack and the assembly was placed between the platens of a press under the following conditions:

| Pressure | $40 \times 10^5$ Pa. |
| --- | --- |

Heating of the press platens : 15 minutes at 50° C., followed by 45 minutes at 200° C.

A polymer creep rate of approximately 20% by weight was observed during the lamination operation. After an additional heat treatment of 6 hours at 235° C., the adhesion of the copper to the 6-ply laminate prepared was examined: this adhesion, measured in a tensometer by pulling the copper at an angle of 90 (according to MIL standard P 55,617 B at a pull velocity of 55 mm/min) was on the order of 15 N/cm; this value was maintained after an aging of 1,000 hours at 200° C.

In a comparative test, the preceding Example 1 was repeated, but in the absence of imidazole. The reaction mixture heated to 160° C. set solid after 1 hour, 30 minutes of mixing. After cooling and grinding, the powder obtained had a softening point of 70° C.; it was very poorly soluble in the above-mentioned solvents. Analysis showed that the bismaleimide had taken little or no part in a reaction with the acrylate reactant. The prepolymer obtained in this manner was unsuitable for the applications described, particularly for the preparation of laminates.

EXAMPLE 2

This example describes a polymer according to the invention, prepared by a continuous process from the reactants (a), (b) and (c).

The equipment employed was a Buss laboratory kneader marketed as "Ko-Kneader" type PR 46. This kneader contained an endless screw consisting of a shaft carrying interrupted helical flights, the interruptions forming separate fins; it was driven by appropriate mechanism. The screw was housed in a body comprising three double-walled adjoining coaxial cylindrical jackets; the inner wall of the kneader body had tooth-shaped projections. The screw was subjected to a rotary motion and simultaneously to an oscillating motion in its axial direction, and this resulted in an exchange of material in two directions.

Water at 20° C. wa circulated in the first jacket and a fluid heated to 155° C. in the other two. The speed of rotation of the screw was 60 revolutions/minute.

N,N'-4,4'-diphenylmethanebismaleimide was introduced into the first part of the kneader (corresponding to the first jacket) by means of a metering balance at a rate of 1,200 g/h; the bismaleimide was introduced in the form of particles whose average dimension was on the order of 0.25 mm.

The combination of an acrylate reactant according to Example 1 +imidazole solution in N-methylpyrrolidone containing 25% by weight of imidazole was introduced at a rate of 304.8 g/h into the second part of the kneader (corresponding to the second jacket).

The reactant metering was such that the bismaleimide represented 79.9% of the weight of the combination of bismaleimide +acrylate reactant, and the imidazole 0.05% of the weight of the same combination.

The mean residence time of the material in the kneader was on the order of 6 minutes, 30 seconds. A prepolymer whose softening point was on the order of 55° C. was collected at the outlet of the device. When heated to 170° C. for 17 minutes, this prepolymer had a softening point of 80° C. It was soluble in solvents such as, for example, N-methylpyrrolidone, cyclohexanone and dimethylformamide, and it had a viscosity of 0.35 Pa.s (measured as indicated in Example 1).

Prepregs and laminates comprising 18 plies (18 layers of prepregs) were prepared using the prepolymer obtained in this manner, under the conditions described above in Example 1 (it should be noted that no copper sheet was employed in this case). After a cure of 6 hours at 235° C., the laminates had the following mechanical characteristics:

Flexural strength, measured at 200° C. (according to NF standard T 51,001): 350 MPa, Flexural modulus: 28,000 MPa.

The prepolymer obtained was also subjected to TMA measurements ("Thermal Mechanical Analysis"; ASTM standard E 831-81 at a rate of temperature increase of 5° C./min). Using the product cured at 235° C., it was found that the average expansion coefficient between 40° C. and 300° C. was 40 μm/m/° C. and that the glass transition temperature was 340° C.

EXAMPLE 3

This example describes a polymer according to the invention, prepared by a continuous process from the reactants (a), (b), (c) and (d).

The apparatus employed was the Buss laboratory kneader marketed as "Ko-Kneader" type PR 46, described in Example 2 above.

Water at 20° C. was circulated through the first jacket of the kneader and a fluid heated to 155° C. through the other two. The rate of rotation of the screw was 60 revolutions/minute.

N,N'-4,4'-diphenylmethanebismaleimide was introduced by means of a metering balance at a rate of 1,200 g/h into the first part of the kneader (corresponding to the first jacket); the bismaleimide was introduced in the form of particles whose mean dimension was on the order of 0.25 mm.

The combination of acrylate reactant +imidazole solution in N-methylpyrrolidone containing 25% by weight of imidazole +brominated epoxy resin was introduced at a rate of 495.4 g/h into the second part of the kneader (corresponding to the second jacket).

The reactant metering was such that the bismaleimide represented 78% of the weight of the combination of bismaleimide +acrylate reactant, the imidazole represented 0.05% of the weight of the combination of bismaleimide +acrylate reactant, and the brominated epoxy resin represented 10% of the weight of the combination of bismaleimide +acrylate reactant.

The acrylate reactant consisted of the mixture described in Example 1 above.

The brominated epoxy resin employed in this case was the result of the condensation of tetrabrominated bisphenol A with epichlorohydrin. It had a bromine content of 20% by weight and an epoxy equivalent weight of 220. It is available commercially under the registered trademark Araldite from CIBA, type LY 8047. The quantity of bromine contributed by the epoxy resin, expressed as the weight percentage of elemental bromine relative to the weight of the overall bisimide +acrylate reactant +epoxy resin composition, was 1.82%.

The mean residence time of the material in the kneader was on the order of 6 minutes, 30 seconds. A prepolymer whose softening point was on the order of 53° C. was collected at the outlet of the apparatus. When heated to 160° C. for 15 minutes, this prepolymer had a softening point of 75° C. It was soluble in solvents such as, for example, N-methylpyrrolidone and dimethylformamide, or in mixtures of these solvents with solvents of a lower boiling point, such as methyl isobutyl ketone.

Prepregs and copper 6-ply laminates (6 layers of prepregs) were prepared with a first portion of the prepolymer obtained. For this purpose, a solution of prepolymer containing 50% by weight in N-methylpyrrolidone was used to coat a glass fabric manufactured by Porcher under the reference 7628, whose weight per unit area was 200 g/m² and which had been subjected to a treatment with gammaaminopropyltriethoxysilane (Union Carbide silane A 1100). The impregnated fabric contained 35 g of prepolymer per 65 g of fabric; it was dried for 5 minutes in a ventilated atmosphere at 130° C. 6 squares (15×15 cm) Were then cut therefrom and were stacked with a sheet of copper 35 μm in thickness which was placed on one of the outer faces of the stack and the assembly was placed between the platens of a press under the following conditions:

| Pressure | 40 × 10⁵ Pa. |
| --- | --- |

Heating of the press platens : 15 minutes at 150° C., followed by 45 minutes at 200° C.

A polymer creep rate of approximately 20% by weight was observed during the lamination operation. After an additional heat treatment of 4 hours at 235° C., the adhesion of copper to the 6-ply laminate prepared was examined: this adhesion, measured in a tensometer by pulling the copper at an angle of 90 (according to MIL standard P 55,617 B at a pull velocity of 55 mm/min), was on the order of 5 N/cm; this value was maintained after an aging of 1,000 hours at 200° C.

Prepregs and laminates comprising 6 plies were prepared with a second portion of the prepolymer obtained above, under the conditions described above (it should be noted that no copper sheet was employed in this case). After a postcure of 4 hours at 235° C., combustibility measurements were carried out using the vertical UL 94 test (thickness of the laminated-based test specimens: 0.8 mm; the burning time is given in seconds after conditioning for 48 hours at 23° C. and 50% relative humidity; the classification is established from an average of 10 results: 5 test specimens and 2 tests on each test specimen):

| Burning time | 3 s; |
| --- | --- |
| Classification | VO. |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A thermally stable bisimido polymer comprising the copolymerizate of:

(a) an N,N'-bismaleimide of the formula:

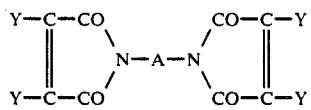

in which:

each of the symbols Y, which may be identical or different, is a hydrogen atom, a methyl radical or a chlorine atom;

the symbol A is a cyclohexylene, phenylene, 4-methyl-1,3-phenylene, 2-methyl-1,3-phenylene, 5-methyl-1,3-phenylene or 2,5-diethyl-3-methyl-1,4-phenylene radical, or a radical of the formula:

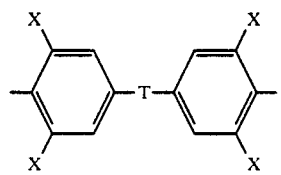

in which T is a single valence bond or one of the groups:

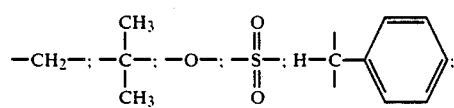

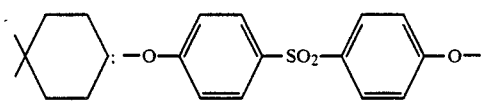

and each of the symbols X, which may be identical or different, is a hydrogen atom or a methyl, ethyl, propyl or isopropyl radical; with (b) an acrylate reactant which comprises either:

(b1) a novolak epoxy (meth)acrylate corresponding to the general formula:

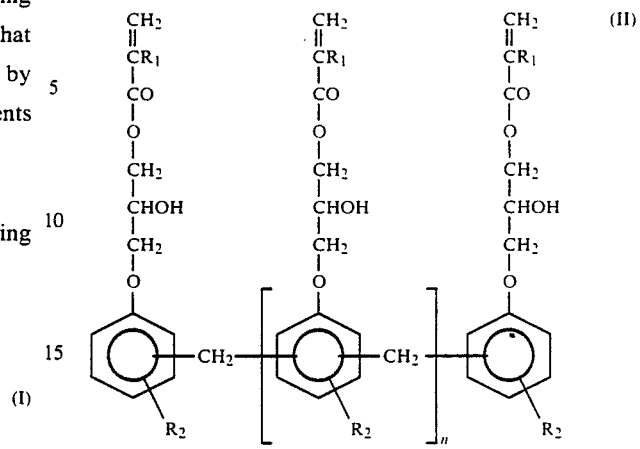

in which:

each of the symbols $R_1$ and $R_2$, which may be identical or different, is a hydrogen atom or a methyl radical; and n is a positive number ranging from 0.1 to 8;

or a mixture of the aforesaid compound (b1) with not more than 30% by weight, relative to the weight of the mixture (b1)+(b2), of a compound (b2) of the general formula:

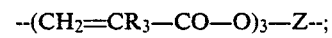

in which:

the symbol $R_3$ is a hydrogen atom or a methyl radical;

the symbol Z is a trivalent linear or branched chain saturated aliphatic hydrocarbon radical containing from 1 to 20 carbon atoms, with the proviso that such radical may contain one or more oxygen bridges and one or more hydroxyl groups; in the presence of (c) an imidazole compound and further comprising a chlorinated or brominated epoxy resin (d1) or a mixture of the resin (d1) with a non-chlorinated or non-brominated epoxy resin (d2).

2. The bisimido polymer as defined by claim 1, said bismaleimide (a) of the formula (I) comprising N,N'-meta-phnylenebismaleimide; N,N'-para-phenylenebismaleimide; N,N'-4,4'-diphenylmethanebismaleimide; N,N'-4,4'-diphenyl ether bismaleimide; N,N'-4,4'-diphenylsulfonebismaleimide; N,N'-1,4-cyclohexylenebismaleimide; N,N'-4,4'-diphenyl-1,1-cyclohexanebismaleimide; N,N'-4,4'-(2,2-diphenylpropane)bismaleimide; N,N'-4,4'-triphenylmethanebismaleimide; N,N'-2-methyl-1,3N,N'-4-methyl-1,3-phenylenebismaleimide; or N,N'-5-methyl-1,3-phenylenebismaleimide.

3. The bisimido polymer as defined by claim 1, said acrylate reactant (b) comprising a novolak epoxy acrylate (b1) of formula (II), in which $R_1$ and $R_2$ are each a hydrogen atom and D is a positive number ranging from 0.1 to 5, or admixture of such acrylate with not more than 25% by weight, relative to the weight of the mixture (b1) +(b2), of trimethylolpropane triacrylate (b2).

4. The bisimido polymer as defined by claim 1, said imidazole compound (c) having the general formula:

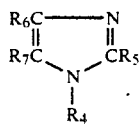

in which each of $R_4$, $R_5$, $R_6$ and $R_7$, which may be identical or different, is a hydrogen atom, an alkyl or alkoxy radical containing from 1 to 20 carbon atoms, or a vinyl, phenyl or nitro radical, with the proviso that $R_6$ and $R_7$ may together form, with the carbon atoms from which they depend, a single ring member.

5. The bisimido polymer as defined by claim 4, said imidazole compound (c) comprising imidazole, glyoxaline, 1-methylimidazole, 2-methylimidazole, 1,2-dimethylimidazole, 1-vinylimidazole, 1-vinyl-2-methylimidazole or benzimidazole.

6. The bisimido polymer as defined by claim 1, comprising an epoxy resin (d1) having an epoxy equivalent weight of from 100 to 500 and which comprises a glycidyl ether prepared by reacting epichlorohydrin with a chlorinated or brominated bis(hydroxyphenyl)alkane, resorcinol, hydroquinone, pyrocatechol, 4,4'-dihydroxydiphenyl, or the condensation product of such polyphenol with an aldehyde; and optionally, an epoxy resin (d2) having an epoxy equivalent weight which ranges from 100 to 500 and comprises a glycidyl ether prepared by reacting epichlorohydrin with a non-chlorinated or non-brominated such polyphenol.

7. The bisimido polymer as defined by claim 1, wherein the amounts of N,N'-bisimide (a) and acrylate reactant (b) are such that the ratio:

$$\frac{\text{number of maleimide groups contributed by the bismide }(a)}{\text{number of acrylic double bonds contributed by the acrylate }(b)}$$

ranges from 1.7/1 to 10/1, and the amount of imidazole compound (c), expressed as the number of moles of compound (c) per 100 g of bisimide (a), ranges from $0.15 \times 10^{-3}$ to $6 \times 10^{-3}$ 8. The bisimido polymer as defined by claim 1, wherein the amount of epoxy resin (d) constitutes 2% to 20% of the weight of the mixture of bisimide (a) +acrylate reactant (b), and the amount of chlorine or bromine contributed by the epoxy resin (d), expressed as the weight percentage of elemental chlorine or of elemental bromine relative to the weight of the overall mixture of bisimide (a) +acrylate reactant (b) +epoxy resin (d), constitutes not more than 6%.

9. The bisimido polymer as defined by claim 1, in cured state and insoluble in polar organic solvents, and which does not exhibit any significant softening below its degradation temperature.

10. The bisimido polymer as defined by claim 1, in heat-curable prepolymer state and soluble in polar organic solvents, and which has a softening point at a temperature below 200° C.

11. A shaped article comprising the bisimido polymer as defined by claim 1.

12. A shaped article comprising the bisimido polymer as defined by claim 9.

13. A shaped article comprising the bisimido polymer as defined by claim 10.

* * * * *